July 11, 1939.　　　P. F. ROSSMANN　　　2,165,942

FLUID PRESSURE OPERATED MASTER CYLINDER

Filed Aug. 19, 1936

INVENTOR
Peter F. Rossmann.
BY
Tibbetts & Hart
ATTORNEYS.

Patented July 11, 1939

2,165,942

UNITED STATES PATENT OFFICE 2,165,942

FLUID PRESSURE OPERATED MASTER CYLINDER

Peter F. Rossmann, Detroit, Mich., assignor to Packard Motor Car Company, Detroit, Mich., a corporation of Michigan Application August 19, 1936, Serial No. 96,750

10 Claims. (Cl. 60—54.6)

This invention relates to fluid braking systems for motor vehicles and more particularly to means for displacing fluid in such braking systems.

An object of the invention is to provide power operated fluid displacing means for vehicle braking systems which is simple, compact and composed of elements associated in a unitary structure.

Another object of the invention is to provide a power operated fluid displacing structure for fluid braking systems wherein physically actuated means can be utilized to control the power means or to actuate the fluid displacing means when the power means fails or is ineffective.

Still another object of the invention is to provide a power control means for fluid braking systems which is physically controlled by mechanism which is sensitive to the application of power so that the operator will be aware of the operating conditions.

These and other objects of the invention will appear from the following description taken in connection with the drawing, which forms a part of this specification, and in which.

Figure 1:
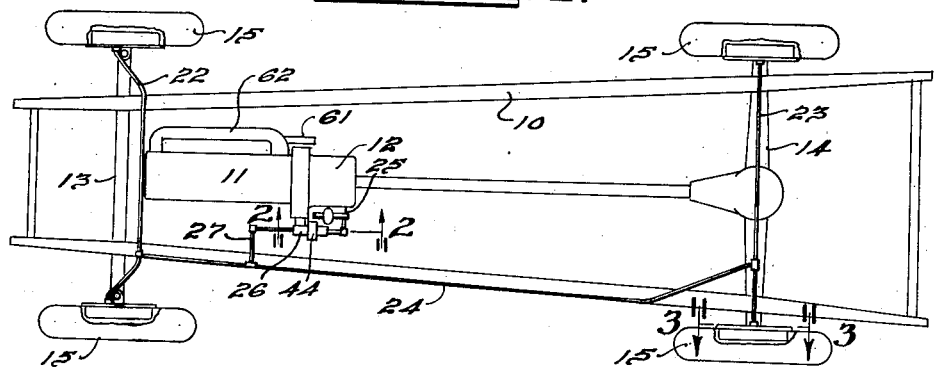
Fig. 1 is a plan view of the motor vehicle chassis having the invention associated therewith.

Referring now to the drawing by characters of reference, 10 indicates the frame of a motor vehicle carrying the usual engine 11 and transmission casing 12. At the forward end of the frame is an axle structure 13 and near the rear end of the frame is a driving axle structure 14. At the ends of the axles are arranged road wheels 15, associated in the conventional manner, each having a brake drum 16 substantially enclosed by a backing plate 17 fixed in a conventional manner on the adjacent axle.

Pivotally mounted on each backing plate at 18 is a pair of brake elements 19 in the form of segmental shoes arranged to engage the adjacent brake drum when moved away from each other. Such pairs of brake elements are normally urged away from contact with their drum by coil springs 20. Means expandable by fluid is associated with the swingable ends of each pair of brake elements and is carried in casing 21, reference may be had to Patent No. 1,962,406, issued June 12, 1934, to A. D. Pentz, for a showing of one form of expandable actuator means which can be used. Conduit 22 connects the front wheel casings 21 and a conduit 23 connects the rear wheel casings 21, such conduits being joined by conduit 24. Such casings and conduits form a fluid containing system in which the fluid is displaced to apply and release the brake elements from their drums as may be desired.

Pivotally mounted on shaft 25, which may be fixed to the transmission casing, is a foot lever 28 arranged to operate fluid displacement means associated with a terminal liquid casing 26 connected by conduit 27 with conduit 24. Casing 26 has flange portions 30 fixed to the transmission casing 12 by bolts 31.

The structure so far described is well known in the art, this invention relating to the liquid displacing means which will now be described. The casing 26 is formed with a lower cylindrical chamber 30 and with an upper reservoir chamber 31, such chambers being connected in open communication by port 32. One end of this fluid containing chamber 30 is connected and in open communication with the conduit 27 while the casing at the opposite end of such chamber is open and terminates in an outwardly extending flange 33. Against this flange an abutment member 35 is fixed by means of rivets 34, the abutment means having an axially extending sleeve bearing portion 36 of smaller diameter than the cylindrical chamber and in axial alignment therewith. A two-diameter piston 37 is arranged to have a sliding fit in the cylindrical chamber and in the abutment bearing sleeve, such piston being formed with an axially extending bore. The piston projects beyond the end of the bearing sleeve remote from the casing and in this end portion of the piston bore is slidably arranged a valve stem 38. Between the end of the valve stem remote from the casing and the foot lever 28 is a connecting rod 39 by means of which the valve stem can be physically actuated when movement thereof toward the casing is desired. The end of the valve stem is formed with a recess 40 providing a seat for the end of the connecting rod 39.

The piston 37 is normally urged into ineffective position, that is toward the open end of the chamber 30, by a coil spring 41 located in the chamber 30 and bearing at one end against gasket 44 engaging the piston head and at the other end against a wall of the casing. Telescoped within the coil spring 41 and projecting into the axial bore in the piston 37 is another coil spring 42 which engages a wall of the casing at one end and the gasket 45 at the other end, such gasket bearing against the end of the valve stem projecting into the piston bore. This spring 42 normally urges the valve stem in a direction away from the abutment 35 and suitable stop means (not shown) is provided to limit the rearward travel of the foot lever 28 beyond the position shown in Fig. 2.

The port 32 establishes communication between the reservoir and the chamber 30 so that the conduits are at all times maintained filled with fluid and also to permit fluid escape into the reservoir when expanded by high temperature. There is also a port 43 through the casing flange 33 which serves as a vent so that pressure conditions between the large end of the piston and the abutment will remain normal. The gaskets 44 and 45 besides acting as seats for the coil springs engaging therewith also prevent escape of fluid past the piston and the valve stem from the chamber 30.

Telescoping the flanged end portion of the casing, the abutment, its sleeve bearing and the valve stem, is a housing consisting of a cup-shaped stamping 44' and another sleeve-like stamping 50. The base of the cup-shaped stamping is formed with a hub portion 45' which slidably engages the bearing sleeve 36, and a suitable sealing ring means 46 is associated with such hub and engages the sleeve bearing. A connector 47, preferably in the form of a stamping, fixes the piston 37 with the housing, such connector having an axially perforated portion which fits against a shoulder 48 on the piston portion projecting beyond the sleeve 36 and held against such shoulder by a retaining ring 49. The connector is formed with a flanged peripheral portion 52 which bears against the base portion of the housing element 44' and the housing element 50 is formed with a peripheral flange 51 which bears against the flanged peripheral portion of the connector, such flanges being secured to the base portion of the housing element 44' by means of rivets 53. The space 56 within the housing element 44' and the space 55 within the housing element 50 is connected in open communication by means of ports 57 formed in the connector and base portion of the housing element 44'.

Welded or otherwise sealed in the end of the housing element 50 remote from the casing is a ring manifold 60 preferable of U-shaped cross section with the open portion facing the chamber 55. A conduit 61 connects the interior of this ring manifold with the intake manifold 62 of the engine 11. The connector 47 is bent to form a circular edge 69 facing the ring manifold and spaced a short distance axially therefrom. Between this circular edge of the connector and the open portion of the ring manifold is a valve member 63 through which the vale stem 38 projects. The valve member bears against a shoulder 66 on the valve stem and is retained in such relation by a snap ring 64. Ports 65 extend through the body of the valve member and this body portion of the valve member is arranged to have a sliding fit within the ring manifold 60. These air ports 65 are arranged in an area confined within a space surrounded by the circular edge 69 of the connector and the peripheral portion of the valve member is arranged to engage against this edge portion 69 of the connector and to cover the open portion of the ring manifold. On one face of the valve peripheral portion is a gasket 67 for closing the open side of the ring manifold and on the other face of this peripheral portion of the valve element is a gasket 68 for engaging the circular edge 69 formed on the connector.

Figure 2:
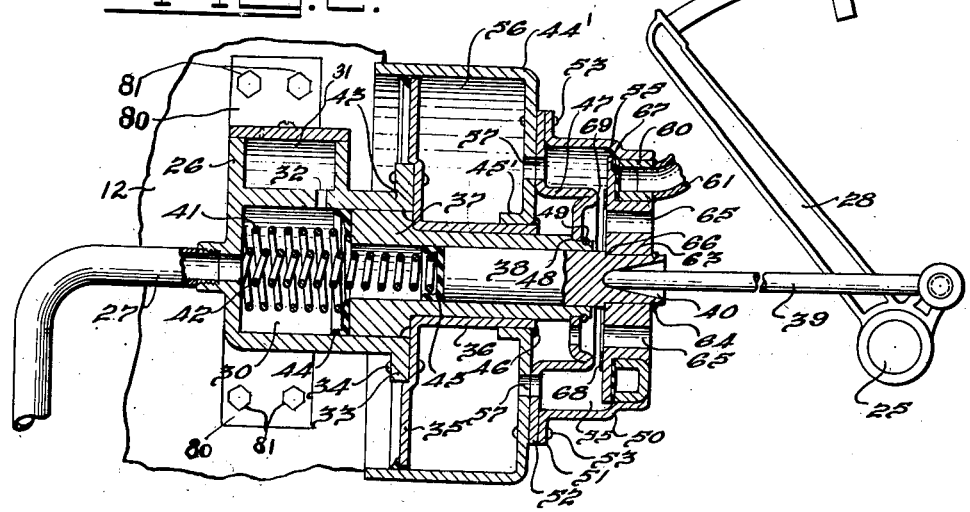
Fig. 2 is a sectional view of the liquid displacing means taken on line 2—2 of Fig. 1, the displacing means being shown in ineffective position.

The fluid displacement means, as shown in Fig. 2, is in ineffective position with the foot lever 28 in its rearmost position and the piston 37 at the rear end of the fluid chamber 30 where it is held by the coil spring 41. The foot lever is held in its rearmost position against a stop means (not shown) by the coil spring 42 bearing against the valve stem 38 with which the connecting rod 39 is associated. When in such position fluid in the conduits 22, 23 and 24 can travel into the chamber 30 so that no pressure is exerted tending to spread the brake shoes 19, and the spring 20 acts therefore to hold the brake shoes away from the brake drum. When the mechanism is in ineffective position the valve shuts off the ring manifold from the interior of the housing and the same is open to atmosphere through the ports 65 and hence no force is exerted to urge the piston in a fluid displacing direction.

Figures 3, 4:
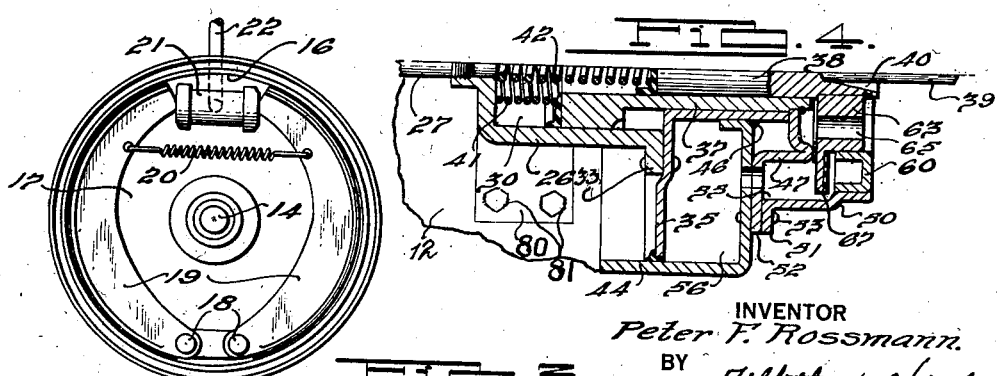
Fig. 3 is a sectional view of one of the brake structures taken on line 3—3 of Fig. 1.
Fig. 4 is a fragmentary sectional view similar to Fig. 2 only showing the mechanism in fluid displacing position.

When it is desired to apply the brakes the operator presses the foot lever 28 toward the left, as viewed in Figs. 2 and 4, the distance required to move the valve member 63 away from the ring manifold 60 and into engagement with the circular edge 69 on the connector. By engaging the circular edge on the connector, ports 65 are shut off so that the interior of the housing is closed to atmosphere and is open to the ring manifold. As the interior of the housing is thus in communication with the intake manifold of the engine pressure in the housing is reduced so that power is in this manner developed to move the housing and the piston connected therewith toward the left, as shown in Fig. 4. This power operation of the piston will continue so long as the valve is held against the circular edge 69 of the connector because during such time the interior of the housing will be maintained in open relation with the intake manifold of the engine. The spring 42 normally tends to unseat the valve from the circular edge 69 of the connector so that communication will be established between atmosphere and the interior of the housing and therefore it is necessary for the operator to move the foot pedal forwardly with the housing in order to maintain the valve 63 in contact with the circular edge 69 on the connector if continued displacement of the fluid from the chamber 30 is to be maintained and the brake shoe elements are to remain in engagement with their brake drums. The physical force required to maintain the device in a relation whereby power will force the piston to the left to displace fluid in the system for the purpose of seating and applying the brakes is very slight.

If for any reason the source of power is ineffective or if the quick application of the brake members is desired then the device can be actuated entirely by physical force upon exerting pressure against the foot pedal 28 in the same direction as exerted to make the power means effective. Under such circumstances the valve stem is moved to the left to engage the valve member with the connector and continued application of force will move the piston 37 through the engagement of the valve member with the connector 47 so that fluid will be forced out of chamber 30 and through the connection 27 to apply a force in the casing 21 sufficiently to set and apply the brake elements against their drums. Thus, with a light physical pressure against the foot pedal, power means displaces the fluid in the braking system while a heavy application of physical force against the foot pedal will move the piston to displace fluid in the system to seat and apply the brake.

The fluid displacing means herein described is of simple construction, compact and formed of parts which can be manufactured at low cost. The device can be associated with the vehicle in a small space and will be entirely effective to efficiently apply the brake elements to their drums by physically controlled power means or entirely by physical force.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor driven vehicle, the combination with the motor intake manifold and a fluid actuator system for mechanism, of fluid displacing means comprising a casing fixed on the vehicle, said casing having a chamber in open communication with the system, an abutment fixed to the casing having a sleeve open to the chamber, an axially bored piston in the chamber and extending through the sleeve, a coil spring in the chamber associated to urge said piston away from the connection with the fluid system, a housing telescoping the abutment and the sleeve, said housing extending beyond the end of the sleeve remote from the casing, a connector fixed to the housing and a portion of the piston projecting beyond the sleeve, a ring manifold fixed in the end of the housing remote from the casing, said manifold being connected with the motor intake manifold, a valve disk slidable in the ring manifold and having air ports therethrough, said disk being operable to shut off the air ports and the ring manifold in extreme positions of its axial movement, a stem slidable in the piston bore and fixed to the valve, a coil spring in the casing chamber and piston bore engaging said stem to normally move said valve into position closing the ring manifold from the housing and opening the air ports thereto, and physically operable means engaging said stem to hold said valve in position cutting off the air ports and opening the ring manifold relative to the interior of the housing.

2. In a vehicle driven by an engine having a suction intake manifold, a power operated fluid brake system comprising a casing fixed on the vehicle formed to provide a lower cylindrical fluid chamber and an upper fluid reservoir in open communication with the chamber, the casing being open at one end of the chamber and connected with the fluid brake system at the other end of the chamber, an abutment fixed to the casing at the open end of the chamber having an axially extending bearing sleeve aligning with the chamber, an axially bored piston slidable in the chamber and the bearing sleeve and projecting beyond the end of the bearing sleeve remote from the casing, a coil spring in the chamber engaging the head of the piston and normally urging it toward the open end of the chamber, a housing telescoping the abutment and extending beyond the end thereof remote from the casing, said housing having a hub portion slidably mounted on said bearing sleeve, a connector fixing the housing to the piston portion projecting beyond the bearing sleeve, said connector having a circular edge portion projecting in a direction away from said casing, a ring manifold fixed in the end of the housing remote from the abutment, said manifold being connected with the engine intake manifold, a disk valve slidably mounted in said ring manifold and having air ports therethrough, a stem extending through said valve and into the piston bore, said stem being fixed to said valve for moving the same to engage either the circular edge portion of said connector or said ring manifold, said valve shutting off communication between the valve air ports and the interior of the housing while engaging the circular edge portion of said connector and shutting off the ring manifold from the interior of the housing while engaging the ring manifold, a coil spring in the casing chamber and piston bore engaging the stem to normally move it to hold the valve against the ring manifold, and physically operable means engaging said stem for holding the valve against the circular edge on the connector whereby the housing and piston are moved by pressure differential to displace fluid from the chamber.

3. In a fluid actuator system, control means comprising a fixed casing containing a fluid chamber connected with the system, said casing having an opening therein at one end of the chamber, an abutment fixed to the casing and having an axially extending bearing sleeve aligning with the opening in the casing, a piston in said chamber and mounted in the bearing sleeve, a housing telescoping the abutment and having a hub slidably mounted on the bearing sleeve, and selective connections for the interior of the housing whereby it is open to atmospheric pressure or less than atmospheric pressure.

4. In a fluid actuator system, control means comprising a fluid terminal chamber, a tubular piston operable in said chamber, a ring manifold connected with a source of pressure less than atmospheric pressure, a housing surrounding said manifold, a wall adjacent the open end of said ring manifold having a circular edge facing the same, a valve between said wall and said manifold, said valve having a ported body portion slidably mounted in the ring manifold, and a physically operable stem slidable in said piston and connected to shift said valve into engagement with the manifold or the wall edge, said valve when engaging said edge closing the housing to the valve ports and opening the manifold to the housing and when engaging the manifold shutting off the manifold from the housing and opening the valve ports to the housing, said valve stem being exposed to pressure in said terminal chamber for reaction against the physical force applied thereto.

5. In a fluid actuator system, control means comprising a casing having a fluid containing chamber connected in the system, a stamped abutment fixed to the casing, a housing composed of stampings telescoping said abutment, a piston in the chamber having a portion extending from the casing and telescoped by the abutment and housing, a stamped connector fixing the housing to the piston, a source of pressure below atmospheric, a valve for selectively connecting the interior of said housing with atmosphere or the source of pressure below atmosphere, and physically operable means for controlling the position of said valve.

6. In a fluid actuator system, control means comprising a casing having a fluid containing chamber connected in the system, a disk abutment fixed to the casing and formed with an axially extending bearing sleeve, a piston in the chamber and projecting through the bearing sleeve, an axially movable housing telescoping the abutment and piston portion in the sleeve bearing, a connector fixing the piston with the housing, a source of pressure below atmospheric pressure, a valve shiftable to connect the interior of the housing with atmosphere or with the source of low pressure, and physically operable means for actuating the valve, said valve being engageable with said connector to actuate said piston and displace fluid from the casing.

7. In a fluid actuator system, control means comprising a fixed casing containing a fluid chamber connected with the system, said casing having an opening in a wall thereof communicating with the chamber, an abutment fixed to the casing and having a bearing sleeve aligned with the opening in the casing wall, a piston extending through the opening in the casing wall and through the sleeve, a housing movably telescoping the abutment and the sleeve and forming therewith a chamber, a connector fixing the housing to the piston, and selective connections for opening the chamber to atmosphere or to atmosphere of sub-normal pressure to actuate said piston.

8. In a fluid actuator system, control means comprising a fixed casing containing a fluid chamber connected with the system, said casing having an opening in its wall leading to the chamber, an abutment fixed to the casing and having a sleeve portion in aligned relation with the casing opening, a piston extending through the opening in the casing wall and extending through the sleeve, said piston having a bore extending axially therethrough, a housing telescoping the abutment and mounted to slide on said sleeve, a connector fixed to the housing and to the piston, a physically controlled valve stem slidable in the end of the piston bore remote from the casing, a valve fixed on the stem, and means selectively controlled by said valve for connecting the interior of the housing with atmospheric pressure or less than atmospheric pressure.

9. In a fluid actuator system, control means comprising a fixed casing containing a fluid chamber connected with the system, said casing having an opening in its wall leading to the chamber, an abutment fixed to the casing and having a sleeve portion in alignment with the casing opening, a piston extending through the opening in the casing wall and extending through the sleeve, said piston having a bore extending axially therethrough, a housing telescoping the abutment and mounted to slide on said sleeve, a connector fixed to the housing and to the piston, a physically controlled valve stem slidable in the end of the piston bore remote from the casing, means normally urging said stem outwardly of the bore, a valve fixed on the stem, and means selectively controlled by the position of said valve for connecting the interior of the housing with atmosphere at normal pressure or with atmosphere at less than normal pressure.

10. In a fluid actuator system, control means comprising a fixed casing containing a fluid chamber connected with the system, said casing having an opening in its wall leading to the chamber, an abutment fixed to the casing and having a sleeve connected in alignment with the casing opening, a piston extending through the opening in the casing wall and extending through said sleeve, said piston having a bore extending axially therethrough, a housing telescoping the abutment and mounted to slide on said sleeve, a connector fixed to the housing and to the piston, a physically controlled valve stem slidable in the end of the piston bore remote from the casing, a manifold spaced from the housing having peripheral passage means connected with a source of pressure lower than atmospheric pressure and passage means interior of the periphery opening to atmosphere, and a valve fixed on said stem between said connector and said manifold, said valve in one position of the stem movement closing the passage means leading to the source of pressure means lower than atmospheric pressure and when in another position opening said last passage means and engaging said connector means to shut off communication between the interior of the housing and the passage means interiorly of the manifold.

PETER F. ROSSMANN.